United States Patent
Thompson et al.

(10) Patent No.: US 10,921,136 B2
(45) Date of Patent: Feb. 16, 2021

(54) EFFICIENT PROCESSING FOR VECTOR TILE GENERATION

(71) Applicant: Mapbox, Inc., San Francisco, CA (US)

(72) Inventors: Mackenzie Blake Thompson, Oklahoma City, OK (US); Ryan Joseph Clark, Tucson, AZ (US)

(73) Assignee: Mapbox, Inc., San Francisco, CA (US)

( * ) Notice: Subject to any disclaimer, the term of this patent is extended or adjusted under 35 U.S.C. 154(b) by 138 days.

(21) Appl. No.: 16/169,584

(22) Filed: Oct. 24, 2018

(65) Prior Publication Data

US 2019/0128679 A1 May 2, 2019

Related U.S. Application Data

(60) Provisional application No. 62/578,216, filed on Oct. 27, 2017.

(51) Int. Cl.
| | |
|---|---|
| G01C 21/32 | (2006.01) |
| G01C 21/36 | (2006.01) |
| G06F 16/29 | (2019.01) |
| G09B 29/10 | (2006.01) |

(52) U.S. Cl.
CPC .......... *G01C 21/32* (2013.01); *G01C 21/367* (2013.01); *G06F 16/29* (2019.01); *G09B 29/106* (2013.01)

(58) Field of Classification Search
CPC ....... G01C 21/32; G01C 21/367; G06F 16/29; G09B 29/106
See application file for complete search history.

(56) References Cited

U.S. PATENT DOCUMENTS

| | | | | |
|---|---|---|---|---|
| 7,672,778 | B1* | 3/2010 | Elliott | G01C 21/32 |
| | | | | 701/417 |
| 8,386,715 | B2* | 2/2013 | Fischer | H04L 67/2842 |
| | | | | 711/122 |
| 9,778,061 | B2* | 10/2017 | Averbuch | G01C 21/3679 |
| 10,030,985 | B2* | 7/2018 | Pfeifle | G09B 29/106 |
| 10,460,495 | B1* | 10/2019 | Loer | G09B 29/005 |
| 2009/0248758 | A1* | 10/2009 | Sawai | G01C 21/32 |
| 2011/0207446 | A1* | 8/2011 | Iwuchukwu | H04L 67/2852 |
| | | | | 455/414.3 |
| 2013/0117322 | A1* | 5/2013 | Fischer | G01C 21/32 |
| | | | | 707/792 |
| 2014/0344296 | A1* | 11/2014 | Chawathe | G06F 16/9574 |
| | | | | 707/755 |
| 2015/0186443 | A1* | 7/2015 | Ito | G06F 16/29 |
| | | | | 707/618 |
| 2018/0052572 | A1* | 2/2018 | Bemel-Benrud | G06F 3/0486 |

* cited by examiner

*Primary Examiner* — Hussein Elchanti
(74) *Attorney, Agent, or Firm* — Fenwick & West LLP

(57) ABSTRACT

A vector tile generator receives map features from a database of raw map data. Each map feature includes geometry data and property data. The vector tile generator stores the property data in a property store. The vector tile generator generates, based on the geometry data, a set of zoom data organized into a plurality of zoom levels. Each zoom level includes at least some of the map features. The vector tile generator maps the map features of the set of zoom data to a plurality of tiles that includes a set of tiles for each of the zoom levels. For each tile, the vector tile generator clips map features mapped to the tile based on a boundary of the tile, encodes the clipped map features to a vector format, and merges the encoded clipped map features with the stored property data corresponding to the map features in the tile.

20 Claims, 8 Drawing Sheets

EFFICIENT PROCESSING FOR VECTOR TILE GENERATION

CROSS REFERENCE TO RELATED APPLICATION

This application claims the benefit of U.S. Provisional Application No. 62/578,216, filed Oct. 27, 2017, which is incorporated by reference in its entirety.

BACKGROUND

This disclosure relates to digital maps. More specifically, this disclosure relates to generating vector tiles for map data.

Digitally stored electronic maps are used to represent geographic information of an area and are displayed to users of mobile and other computing devices, for example, using any of a wide array of standalone map or direction application programs or apps. Electronic maps are commonly represented as tiles. Segments of maps are represented as tiles, which can be joined together for analysis or display. Tiles are typically available at various zoom levels having different levels of detail. For example, an area represented by a single tile at one zoom level may be represented by four smaller, more detailed tiles at the next higher zoom level.

Digital map systems create tiles based on data describing various geographic features, such as built features (roads, buildings, etc.), geological features (rivers, lakes, etc.), political features (e.g., borders of countries, states, counties, etc.). Current methods for creating tiles are inefficient and require significant computing power. In current implementations, tile generation involved defining the boundaries of each tile, pulling raw data relevant to each tile, and processing the relevant data to generate the tile. Because many map features span across multiple tiles, current tile generation methods often involve pulling and processing data for such features many times, e.g., for each tile that includes a particular feature. This makes processing data sets slow and resource-intensive. In addition, inefficient tile processing makes it difficult or impossible for current digital map systems to integrate new data to their maps on an as-needed basis. As a result, digital map systems often are unable to capture latest or temporary changes in map data, such as road constructions and temporary detours, new or temporary building features, areas that are temporarily inaccessible (e.g., because of flooding), etc. Without the ability to quickly create and update map tiles, a map application may not provide up to date information to users relying on the map data.

SUMMARY

This disclosure relates to an efficient method for generating map tiles based on raw map feature data. As used herein, map features, also referred to as features, are any shapes that represent physical features on a map. For example, map features can represent built features (roads, buildings, etc.), geological features (rivers, lakes, mountains, etc.), and political features (e.g., borders of countries, states, counties, etc.). Map features can be represented on a map using various geometries, such as points, polygons, and lines. To generate a map tile from raw feature data, tile generation systems identify features located within the map tile, simplify the identified features based on the zoom level of the map tile, and the clip the features to the size of the tile. For example, a map includes a river having a number of increasingly small tributaries. For a given map tile that includes a portion of a river and some of the tributaries, the tile generation system retrieves the feature data describing the river and tributaries, simplifies the features by removing some tributaries that are not displayed for that tile's zoom level, and clips the features by isolating the portion of the river that crosses that map tile. As described above, performing this processing tile-by-tile is slow and inefficient. The tile generation process described herein improves speed and efficiency compared to previous tile generation processed.

In an embodiment, a vector tile generator identifies a set of map features from a database of raw map data. The raw map data includes geometry data and property (or attribute) data for each feature. For example, for a road, the geometry data describes the path of the road, the width of the road, and other data describing the physical shape and location of the road within the map. The property data for the road may include the name of the road, the speed limit, the direction of travel, and other types of information describing the road that does not relate to the road geometry. The vector tile generator stores the property data and operates on the geometry data. First, the vector tile generator operates on the geometry data at various zoom levels. In particular, at each zoom level, the vector tile generator simplifies the geometry data based on the zoom level, e.g., by retaining many feature details at lower zoom levels, and retaining large features and removing smaller features at higher zoom levels. The vector tile generator then maps the geometry data remaining at each zoom level to tiles for the zoom level. The vector tile generator clips the geometry data for each tile to the size of the tile, and encodes the tile data in a standard vector tile format. The vector tile generator then retrieves the properties for each feature in each tile, and merges the properties data with the encoded geometry data to produce the completed map tiles.

This process increases efficiency for several reasons. First, by initially operating on the geometry data at different zoom levels, the vector tile generator performs the simplification step once for each feature at each zoom level, unlike in prior methods where the same feature could be simplified multiple times for different tiles. Second, at each stage, the vector tile generator can process various parts of the map data in parallel. For example, the vector tile generator can simplify the geometry data for each zoom level in parallel, and clip the features for each tile in parallel (or in multiple parallel queues). Third, the processed geometry data moves from stage to stage, unlike prior processes which involved complex indexing of data and frequent querying of the raw map data.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Other embodiments, aspects and features will become apparent from the disclosure as a whole.

Example Computer System Implementation

Figure 1:
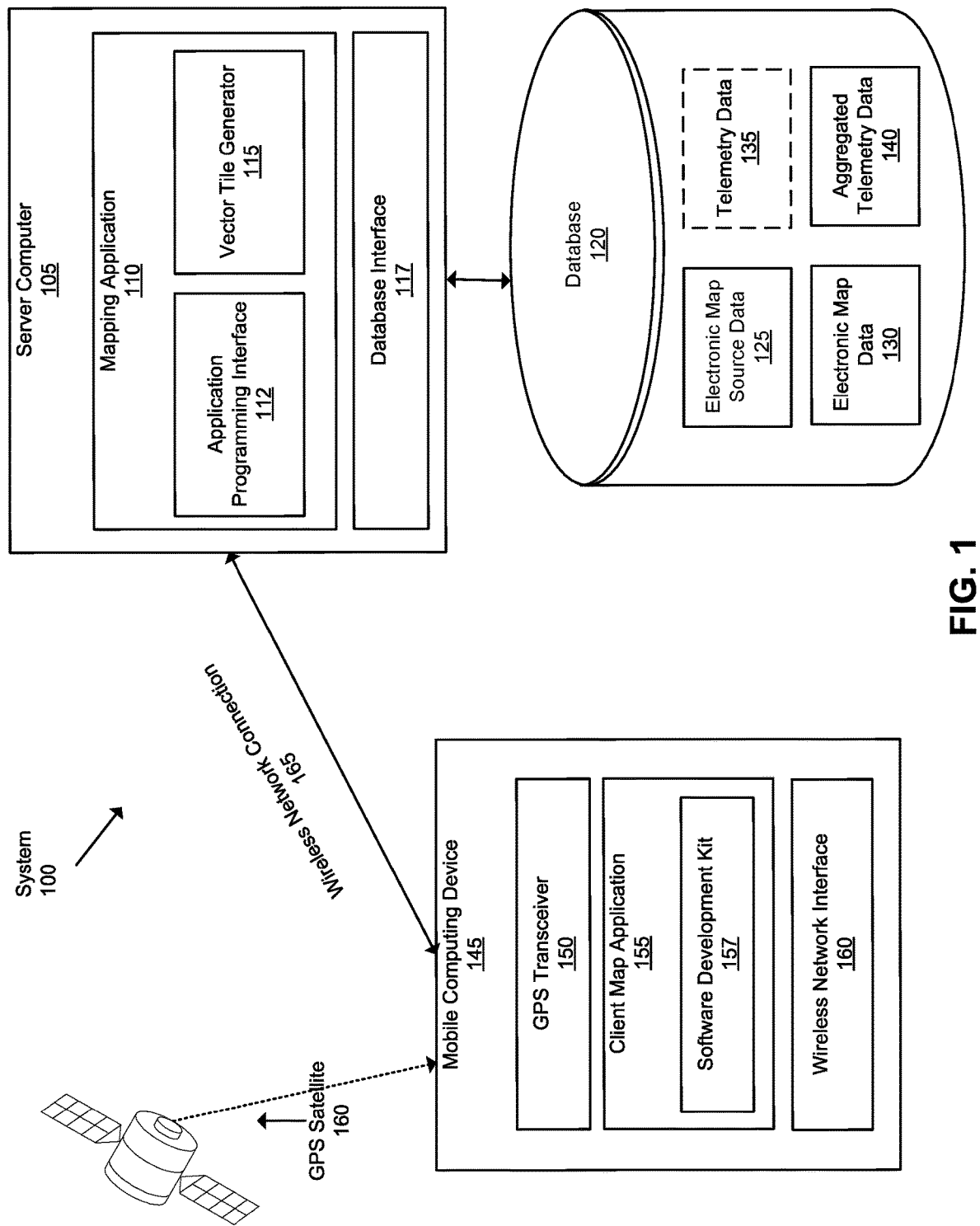
FIG. 1 illustrates an example computer system in which the techniques described may be practiced, according to one embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer 105 comprises a mapping application 110, an application programming interface (API) 112, a vector tile generator 115, and a database interface 117. The database 120 comprises electronic map source data 125, electronic map data 130, telemetry data 135, and aggregated telemetry data 140. The mobile computing device 145 comprises a GPS transceiver 150, client map application 155, software development kit (SDK) 157 and wireless network interface 159.

Server computer 105 may be any computing device, including but not limited to: servers, racks, workstations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a data center such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110 and may include other applications, software, and other executable instructions, such as database interface 117, to facilitate various aspects of embodiments described herein.

In one embodiment, a database interface 117 is a programmatic interface such as JDBC or ODBC for communicating with database 120. The database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third-party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 are raw digital map data that are obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval and may be stored for any amount of time. Once obtained or received, electronic map source data 125 are used to generate electronic map data 130.

In one embodiment, electronic map data 130 are digital map data that are provided, either directly or indirectly, to client map applications, such as client map application 155, using an API. Electronic map data 130 are based on electronic map source data 125. Specifically, electronic map source data 125 may be processed and organized as a plurality of vector tiles which may be subject to style data to impose different display styles. Electronic map data 130 may be updated at any suitable interval and may include additional information beyond that derived from electronic map source data 125. For example, various additional information may be stored in the vector tiles, such as traffic patterns, turn restrictions, detours, common or popular routes, speed limits, new streets, and any other information related to electronic maps or the use of electronic maps.

In one embodiment, telemetry data 135 are digital data that are obtained or received from mobile computing devices 145 via function calls that are included in a Software Development Kit (SDK) that application developers use to integrate and include electronic maps in applications. In one embodiment, telemetry data 135 are anonymous sensor data that are corrected from various users of the map applications 155 that are installed in the mobile computing devices 145 based on users' voluntary reporting. The telemetry data 135 may include various anonymous map-related data collected by the mobile computing devices 145. As indicated by the dotted lines, telemetry data 135 may be transiently stored, and are processed as discussed below before storage as aggregated telemetry data 140.

More specifically, the telemetry data 135 include time observations and location information based on GPS signals. In one embodiment, the time and location of telemetry data 135 associated with a single mobile computing device 145 is referred to as a trace. Telemetry data 135 may additionally include one or more digitally stored events, in which each event comprises a plurality of event attribute values. Telemetry events may include session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 140 are telemetry data 135 that have been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, endpoints, or otherwise break telemetry data into any size. Filtering may remove inconsistent or irregular data, delete traces or trips that lack sufficient data points, or exclude any type or portion of data for any reason. Once processed, aggregated telemetry data 140 may be stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, mobile computing device 145 is any mobile computing devices, such as a laptop computer, hand-held computer, wearable computer, cellular or mobile phone, portable digital assistant (PDAs), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use Wi-Fi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to the mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, and any other aspects of embodiments described herein. Mapping application 110 includes vector tile generator 115, which is programmed or configured to generate the electronic map data 130 based on the electronic map source data 125. In an embodiment, the mapping application 110 may also reside in the mobile computing device 145.

According to one embodiment, the techniques described herein are implemented by one or more computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Hardware Implementation

Figure 2:
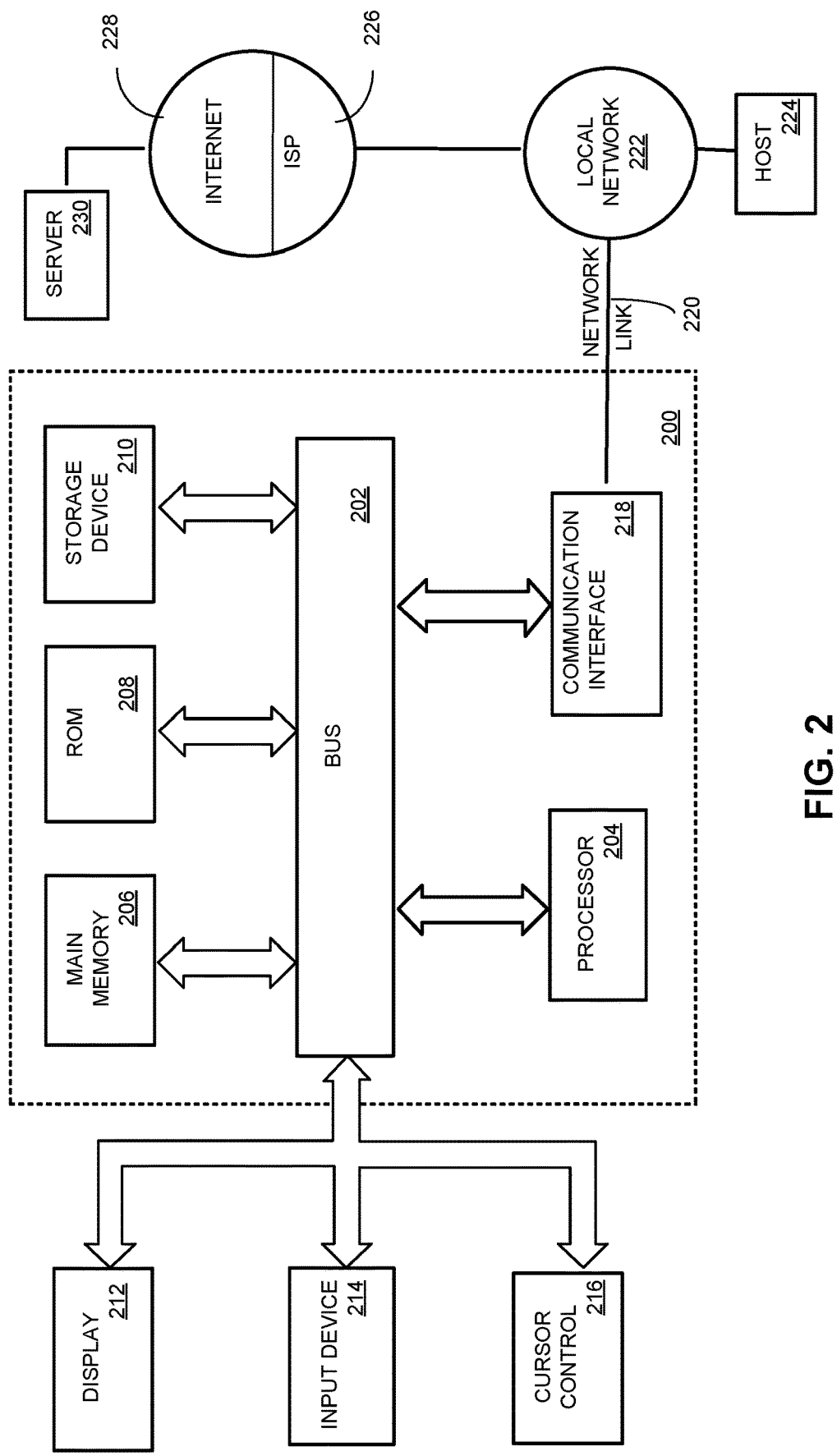
FIG. 2 illustrates a computer system upon which an embodiment may be implemented.

FIG. 2 is a block diagram that illustrates a computer system 200 upon which an embodiment of the invention may be implemented. Computer system 200 includes a bus 202 or another communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or another dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read-only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as an LCD screen, LED screen, or touch screen, for displaying information to a computer user. An input device 214, which may include alphanumeric and other keys, buttons, a mouse, a touchscreen, or other input elements is coupled to bus 202 for communicating information and command selections to processor 204. In some embodiments, the computer system 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. In one embodiment, a memory (e.g., main memory 206 and ROM 208) in the computer system 200 may include a non-transitory computer readable storage medium configured to store program code. The program code includes instructions that, when executed by a processor, cause the processor to perform various methods and processes described herein.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226, in turn, provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received and be stored in storage device 210, or other non-volatile storage for later execution.

Vector Tile Generator

Figure 3:
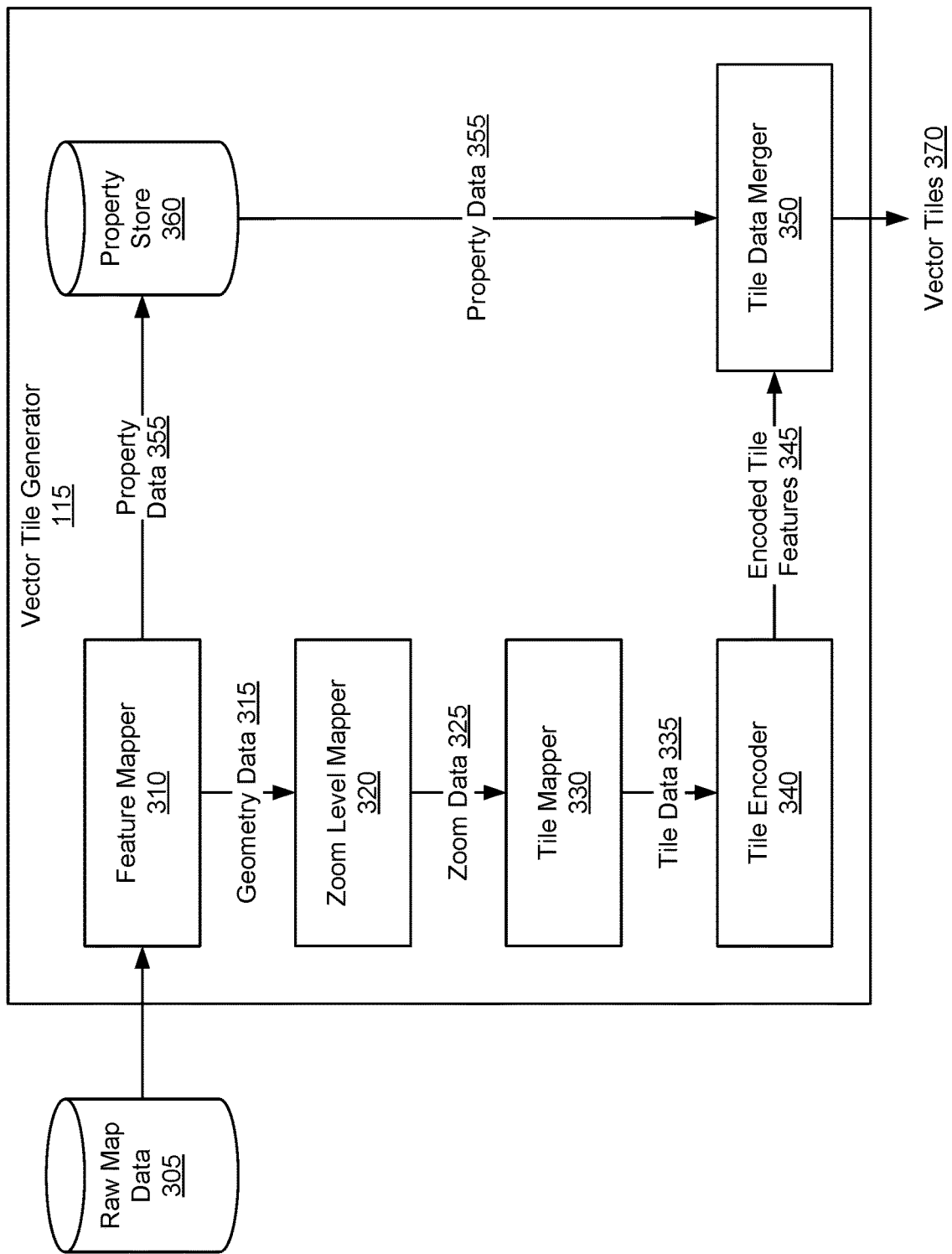
FIG. 3 is a block diagram illustrating a vector tile generator, in accordance with an embodiment.

FIG. 3 is a block diagram illustrating the vector tile generator 115, in accordance with an embodiment. The vector tile generator 115 includes a feature mapper 310, a zoom level mapper 320, a tile mapper 330, a tile encoder 340, a tile data merger 350, and a properties store 360 that cooperate to generate vector tiles based on raw map data 305, such as the electronic map source data 125. Different and/or additional components may be included in the vector tile generator 115, but those components are not shown in FIG. 3. Further, multiple components shown in FIG. 3 may be combined into single components.

The vector tile generator 115 is used to generate electronic map data for maps that can be displayed in a graphical user interface, e.g., an interface of a routing application. Electronic map data are data that describe the territories, locations, coordinates, geometries, sizes, contours, elevations of objects (e.g., roads, buildings, etc.) and metadata that label the objects in the map and provide additional information to the map. Electronic map data may be arranged in the form of tiles. Tiles are building blocks of an electronic map. Electronic maps can be displayed at different zoom levels. A tile may be associated with a particular zoom level. When the zoom level of the map changes, different tiles are used to construct the map. For example, when a user chooses to zoom an electronic map from a less zoomed level to a more zoomed level, tiles corresponding to larger areas are replaced by tiles corresponding to smaller areas to construct a more zoomed-in map.

The vector tile generator 115 generates electronic map data in the form of vector tiles. Vectors are collections of mathematical values and directions that define geometries, road outlines, and other properties of an electronic map. Each tile may include multiple vectors that define the objects (e.g. roads, buildings, etc.) in the geographical location associated with the tile. In one embodiment, when a user specifies a location and a zoom level in the client map application 115, the mapping application 110 requests and receives electronic map data 130 that includes one or more vector tiles generated by the vector tile generator 115. The mapping application 110 then renders a map for display in a graphical user interface based on the retrieved vector tiles. When the user selects a different location and/or a different zoom level, different sets of vector tiles are transmitted to the mobile computing device 145 to construct different maps for display in the graphical user interface. For example, if a user zooms in, the mapping application 110 displays a map made up of tiles each showing a smaller area in more detail, and if a user zooms out, the mapping application 110 displays a map made up of tiles each showing a larger area in less detail. As another example, if the user pans to a different location at the same zoom level, the mapping application 110 displays a map made up of tiles each showing a different region from a previously-displayed region. If the new region partially overlaps with a previously-displayed region, the mapping application 110 reuses some of the previously-displayed tiles to display the new region.

To generate the vector tiles, the vector tile generator 115 retrieves data describing various map features from the raw map data 305. The raw map data 305 is a database of raw digital map data, such as some or all of the electronic map source data 125. The raw map data 305 includes data describing geometry of the features and properties of the features. Geometry data includes data related to the location, shape, and size of the spatial features, e.g., position, shape, width, length, elevation, etc. For example, for a road, the geometry data describes the path of the road and the width of the road. Some features may be represented using polygons, while other features may be represented as lines, joined line segments, points, or other geometric shapes. The vector tile generator 115 primarily operates on the geometry data to generate the geometries within each vector tile. Property data includes data that may not be relevant to the location, shape, and size of the spatial features, and that is not used to generate the geometries within the vector tiles. For example, property data for the road may include the name of the road, the roadway classification, the speed limit, the direction of travel, and other types of information describing the road that is potentially used or displayed by the mapping application 110 or client map application 115, but that does not relate to the road geometry. In some embodiments, property data includes data that describes the shape or size of spatial features, but is not used in generating the vector geometries. For example, a height of a building, or a number of lanes in a roadway, describes sizes of these features, but this data may be classified as property data if it not used to generate vector tile geometries.

The feature mapper 310 receives data from the database of raw map data 305. The feature mapper 310 identifies the features described by the raw map data 305 and separates the data for each identified feature into property data 355 and geometry data 315. The feature mapper 310 passes the property data 355 to a property store 360, which temporarily stores the property data 355. The feature mapper 310 passes the geometry data 315 to the zoom level mapper 320. The property data 355 and geometry data 315 are each identified by feature (e.g., using a feature identifier) so the property data for each feature can be rejoined with the geometry data 315 for the corresponding feature after the geometry data has been processed. The feature mapper 310 may assign feature identifiers to the various features, or the raw map data 305 may include feature identifiers.

The zoom level mapper 320 maps the geometry data 315 to multiple zoom levels. The zoom level mapper 320 generates multiple sets of feature data, one for each zoom level. The zoom level mapper 320 scales and simplifies the geometry data 315 based on the zoom level. Each zoom level includes at least a subset of the features represented by the geometry data 315. The zoom levels include different levels of detail, and some zoom levels include more features than others. For example, a higher level of zoom (more zoomed in) includes a greater number of features and/or greater levels of geometric data for the features than a lower level of zoom (less zoomed in). The sets of modified geometry feature data for the multiple zoom levels are referred to jointly as zoom data 325. The zoom level mapper 320 outputs the zoom data 325 to the tile mapper 330. In some embodiments, the zoom level mapper 320 may store the zoom data 325 in a zoom data store for use later in the vector tile generation process. The zoom level mapper 320 can operate on multiple zoom levels in parallel. In particular, the zoom level mapper 320 can generate the zoom data 325 for each zoom level independently and in parallel, because each zoom level is generated based on the raw geometry data 315.

As an example, for map data for the state of Maine, the zoom data 325 for a given zoom level includes various cities, such as Portland, Bangor, Augusta, and Bar Harbor, and major roads, such as I-95 and I-295, and a simplified outline of the coastline. At a higher zoom level, the zoom data 325 includes additional cities, such as Brunswick, Lewiston, and Waterville, smaller roads, and a more detailed coastline. The zoom level mapper 320 simplifies certain features, like the coastline and roadway curvature details, based on the zoom level. In addition, the zoom level mapper 320 selects features for a zoom level based on relative sizes, relative importance, or other factors. For example, for the lower zoom level, the zoom level mapper 320 may select to include Augusta but not Waterville because Augusta is the state capital, even though Waterville has a slightly larger population. As another example, the zoom level mapper 320 selects major interstates and larger state highways for the lower zoom level, and also selects smaller state highways at the higher zoom level. In some embodiments, the zoom level mapper 320 may retrieve property data 355 stored in the property store 360 and select features based on the property data 355. In other embodiments, data that the zoom level mapper 320 uses to select features for different zoom levels, such as capital city designations, roadway designations, etc., is included in the geometry data 315.

The tile mapper 330 receives the zoom data 325 from the zoom level mapper 320 and maps the features for each zoom level to tiles for each zoom level. At each zoom level, the tile mapper 330 divides the map into a set of tiles, and identifies the features that fall within each tile. This process involves laying a grid over the zoom data 325 for each zoom level, with the tiles corresponding to smaller areas at higher zoom levels, and the tiles corresponding to larger areas at lower zoom levels. The tile mapper 330 identifies, for each tile, the features that are included, either partially or fully, within the boundary of the tile. The tile mapper 330 may determine the features for a tile at a given zoom level by comparing the positions of the boundaries of each feature in the zoom level data 325 to the boundaries of the tile, and determining if any portion of each feature is within the boundaries of the tile. For example, one tile for the map of Maine may include Portland, I-95, and I-295, and another tile includes Bangor and also includes I-95. Because I-95 stretches across the state of Maine, many tiles include I-95. The tile mapper 330 generates tile data 335, which lists, for each tile, a set of the features included in the tile.

The tile mapper 330 allows for a great deal of parallel processing. The tile mapper 330 can operate on the zoom data for different zoom levels in parallel, and determines the tile data for each zoom level independently of the other zoom levels, based on the zoom data 325 for the corresponding zoom level. In some embodiments, the tile mapper 330 can also operate on different tiles within a zoom level in parallel.

The tile encoder 340 receives the tile data 335 from the tile mapper 330 and clips and encodes the tile data 335 for each tile. The tile data 335 indicates the features that are included within each tile, but many features may span across multiple tiles. For each tile, the tile encoder 340 clips the features that extend beyond the tile to the boundaries of the tile. In some embodiments, the tile encoder 340 adds a buffer around the tile, and clips the features to the boundaries of the buffer around the tile. For example, the buffer can include an additional 10-25% of the tile width on each side of the tile. Other buffer sizes may be used; for example, the width buffer can be up to 100% of the tile width. To clip the features to the boundaries of the buffer, the tile encoder may compare the boundaries of each feature in a tile to the boundaries of the buffer, identify the portion or portions of the feature that are within the boundaries of the buffer, and retain the geometry data describing the portion or portions of the feature that are within the boundaries of the buffer, while discarding the geometry data for portions of the feature that are outside the boundaries of the buffer. For example, for the tile that includes Bangor and I-95, the tile encoder 340 determines the geometry of I-95 that falls within the boundaries of the buffer, and retains geometry data that describes the portion of I-95 within the tile or the buffer around the tile. For a given zoom level, each tile that includes I-95 includes the geometry data for distinct, non-overlapping portions of I-95. The buffer areas include overlapping portions; for example, geometry data within portion of a buffer along the right of a first tile is also included in the geometry data for a second tile to the right of the first tile. After determining the final geometry data for each tile, the tile encoder 340 encodes the geometry data of the tile using a standard vector tile format. The tile mapper 330 may determine that some tiles do not include any features. For each tile that does not include any features, the tile encoder 340 may encode a null feature set for the tile. The result of the clipping and encoding process is a data set of encoded tile features 345. In some embodiments, a buffer is not used, and the features are clipped to the boundaries of the tiles themselves.

In some embodiments, the tile data 335 includes the geometry data for the features in each tile. However, because features can appear on multiple tiles, this can result in a large amount of data being passed from the tile mapper 330 to the tile encoder 340 (e.g., the feature data for I-95 may be included for each tile that includes some portion of I-95). To reduce the amount of data being passed, the zoom data 325 that includes the processed geometry data may be temporarily stored in a zoom data store, and the tile data 335 may include a list of features for each tile, but does not include the processed, zoom level geometry data. In this embodiment, the tile encoder 340 retrieves the processed geometry data from the zoom data store relevant to each particular tile being clipped and encoded.

As with the zoom level mapper 320 and the tile mapper 330, the tile encoder 340 also enables a great amount of parallel processing. The tile encoder 340 can operate on different tiles in different zoom levels, or even within the same zoom level, independently and in parallel. Because the tile data 335 includes the tile boundaries and a list of features for each tile, the tile encoder 340 can access the zoom data store, clip the retrieved features, and encode the clipped features for each tile independently of the other zoom tiles.

The tile data merger 350 receives the encoded tile features 345 from the tile encoder 340 and merges the encoded tile features 345, which describe the geometry of the features in each tile (and buffer), with the feature property data 355, which the tile data merger 350 retrieves from the property store 360. As noted above, the geometry data 315 and property data 355 each include feature identifiers for each feature, and the feature identifiers are retained for each feature as the geometry data 315 is processed by the zoom level mapper 320, the tile mapper 330, and the tile encoder 340. For each feature on each tile, the tile data merger 350 retrieves the feature identifier, identifies the corresponding property data for the feature based on the feature identifier, and adds the corresponding property data to the encoded tile features. The output of the tile data merger 350 is a set of vector tiles at each of a set of zoom levels, each tile including both geometry data and property data.

While the vector tile generator 115 has been described as generating a set of vector tiles, in other embodiments, a tile generator can use a similar process to generate map tiles in different formats. For example, the tile encoder 340 can encode the clipped features as image data rather than vector data, and the tile data merger 350 outputs image tiles rather than vector tiles. As another example, the vector tile generator 115 can generate tiles for direction or search data, such as a road network graph or geocoding points. This vector tile generator 115 can operate on the direction or search data alone, or can bundle this data with vector data.

Example Vector Tile Generation Process

Figure 4:
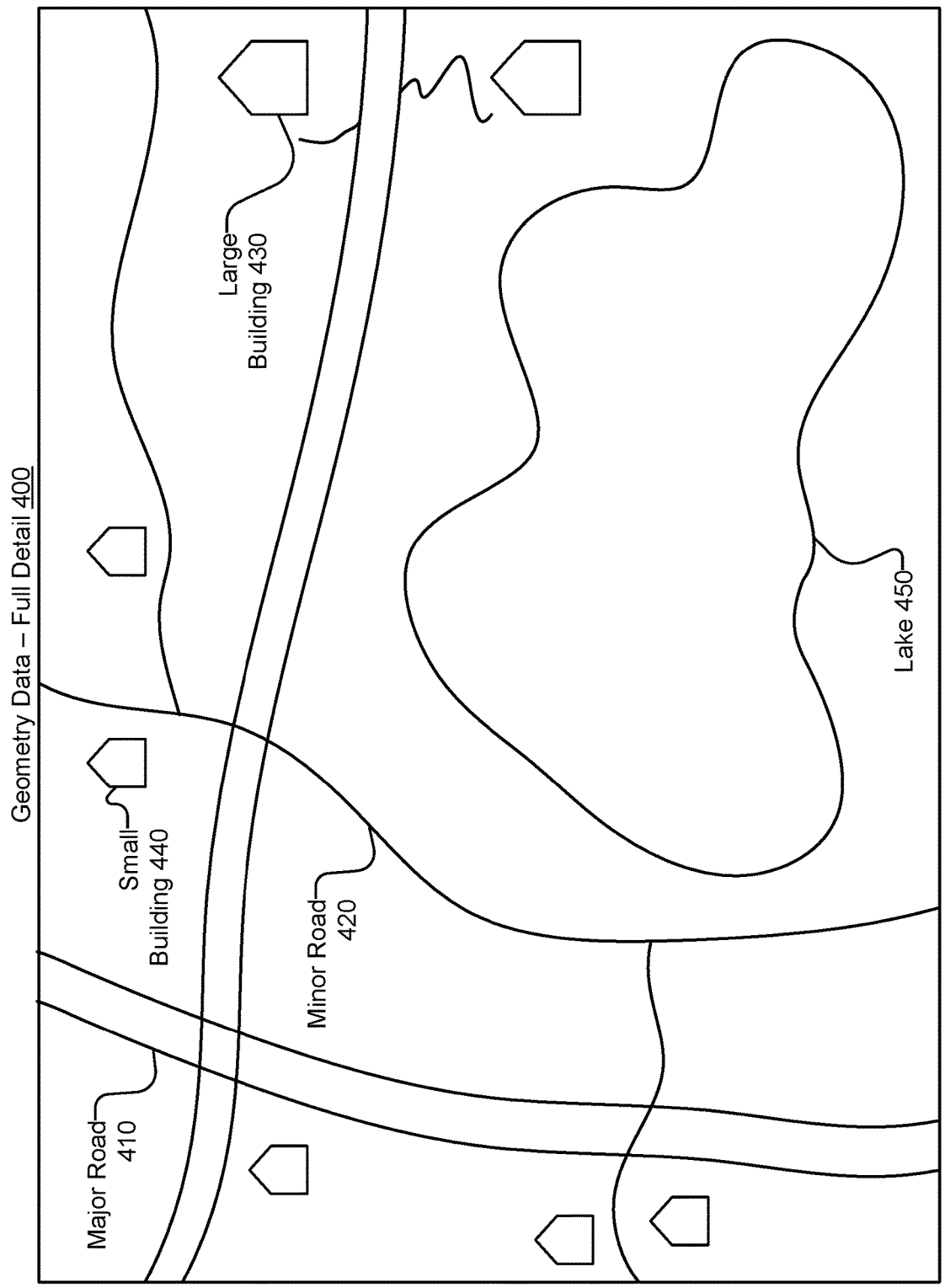
FIG. 4 is an illustration of raw geometry data, in accordance with an embodiment.

FIGS. 4-8 each show portions of a visual illustration of a vector tile generation process performed by the vector tile generator 115. FIG. 4 is an illustration of a portion of raw geometry data 400, in accordance with an embodiment. The geometry data 400 shows the full level of detail available for each feature on the map portion. In the map portion shown in FIG. 4, the geometry data 400 includes several major roads 410 and minor roads 420. As shown, the minor roads 420 are narrower than the major roads 410. The geometry data 400 also includes two large buildings 430, five small buildings 440, and a lake 450. The large buildings 430 are connected by driveways to one of the major roads 410. The geometry data 400 describing these features 410-450 is provided to the vector tile generator 115 to generate vector tiles based on the geometry data. The feature mapper 310 may identify the various features included in the geometry data 400, and store corresponding property data in the property store 360, as discussed with respect to FIG. 3.

Figure 5:
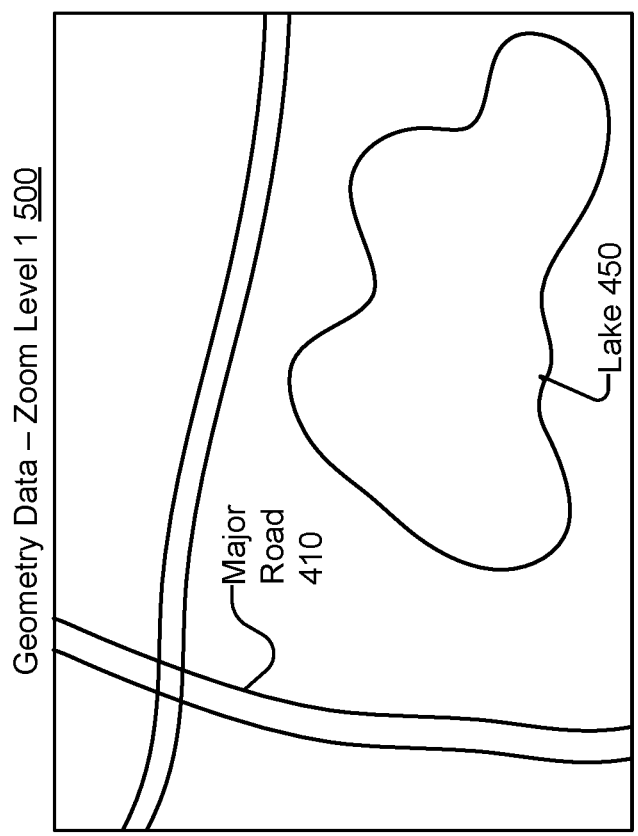
FIG. 5 is an illustration of geometry data at a first zoom level, in accordance with an embodiment.

FIG. 5 is an illustration of the portion of geometry data at a first zoom level 500, in accordance with an embodiment. The first zoom level 500 is an example of one of the zoom levels generated by the zoom level mapper 320 based on the geometry data 400. The first zoom level 500 is a relatively low level of zoom. As shown, the zoom level mapper 320 has scaled down the feature sizes relative to the feature sizes depicted in the raw geometry data 400. In addition, the zoom level mapper 320 has removed multiple smaller features—the minor roads 420, and both the large and small buildings 430 and 440—to simplify the map for the lower zoom level.

Figure 6:
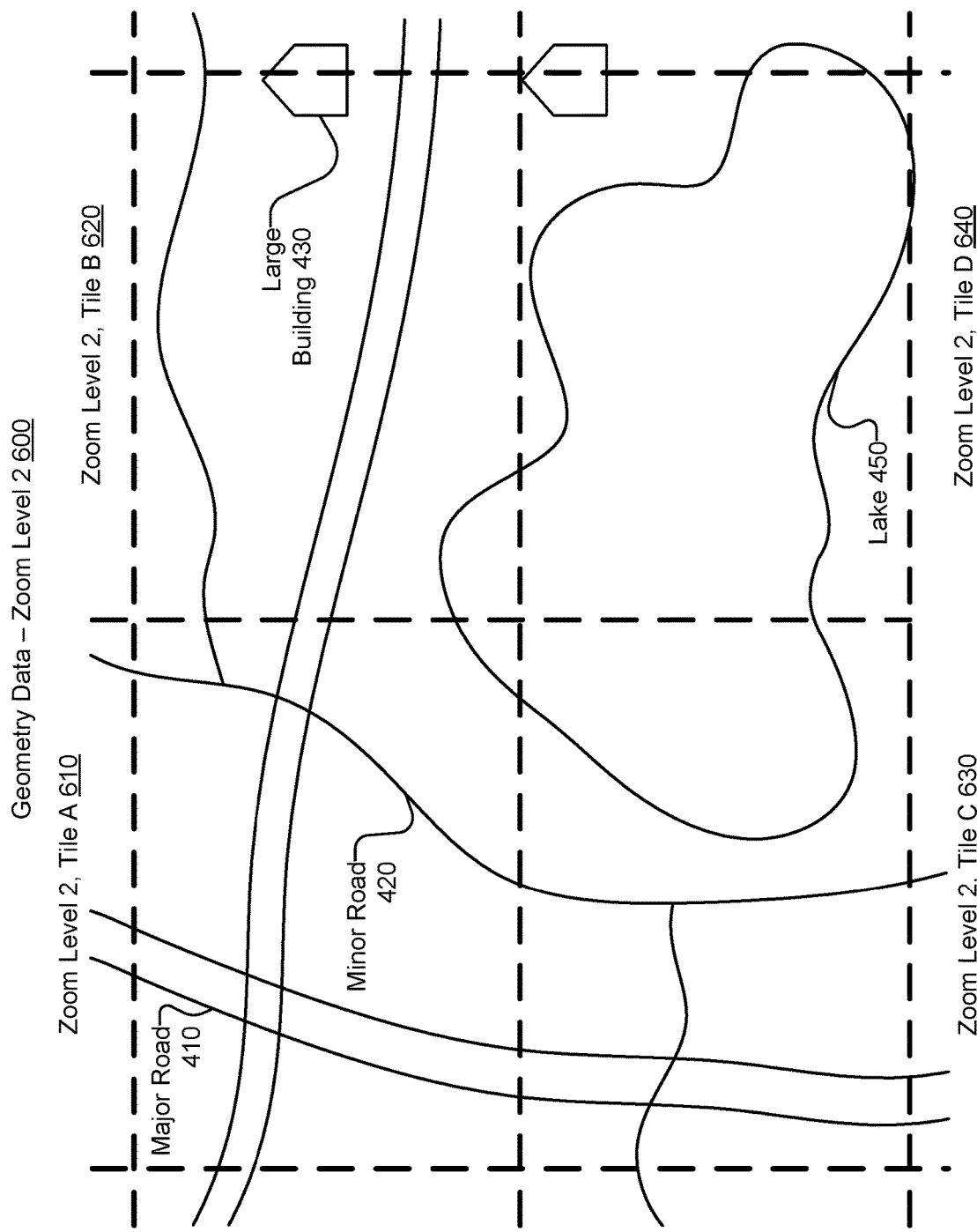
FIG. 6 is an illustration of geometry data at a second zoom level having a set of tiles, in accordance with an embodiment.

FIG. 6 is an illustration of the portion of geometry data at a second zoom level 600 with an overlaid set of tiles 610-640, in accordance with an embodiment. The second zoom level 600 is an example of another one of the zoom levels generated by the zoom level mapper based on the geometry data 400. The second zoom level 600 is a higher level of zoom than the first zoom level 500. As shown, the zoom level mapper 320 have removed several smaller features—the small buildings 440, and the driveways connecting the large buildings 430 to the road—to simplify the map. The zoom level mapper 320 has also slightly scaled down the feature sizes relative to the feature sizes depicted in the raw geometry data 400.

Four full tiles are shown overlaid over the portion of geometry data at the second zoom level 600. Zoom level 2, tile A 610 includes most of the upper left quadrant of the portion of geometry data shown in FIG. 6. Zoom level 2, tile B 620 includes most of the upper right quadrant; zoom level 2, tile C 630 includes most of the lower left quadrant; and zoom level 2, tile D 640 includes most of the lower right quadrant. Along the sides of these four tiles, additional tiles, partially shown in FIG. 6, encompass other portions of the geometry data 600. The partially-shown tiles also may include geometry data outside the geometry data shown in FIG. 6. The tile mapper 330 overlays the tiles 610-640 over the geometry data for the second zoom level 600.

Figure 7:
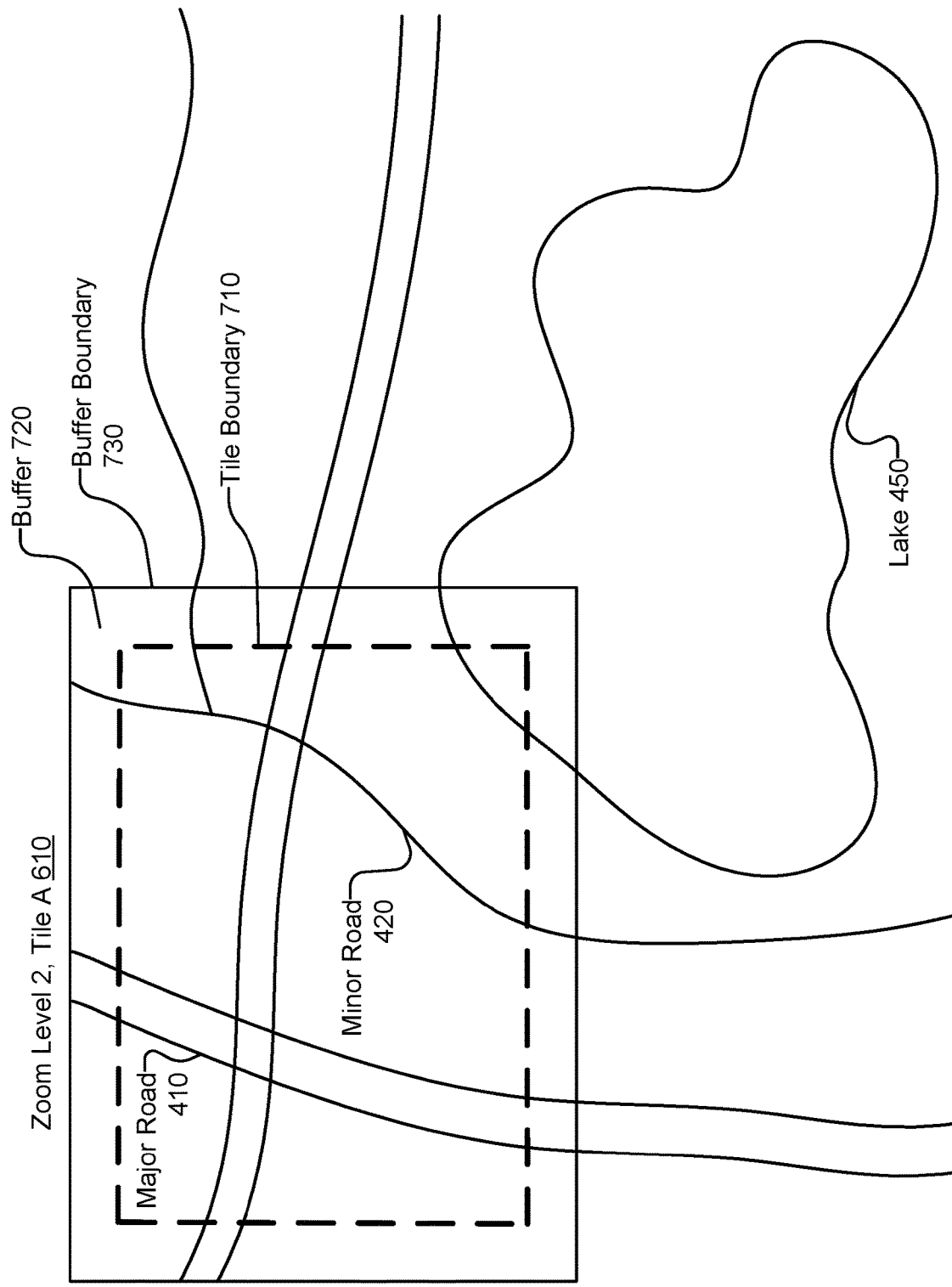
FIG. 7 is an illustration of features for a particular tile at the second zoom level, in accordance with an embodiment.

FIG. 7 is an illustration of features for a particular tile 610 and a buffer for the tile at the second zoom level, in accordance with an embodiment. A tile boundary 710 shows the boundary of Tile A 610. Tile A 610 is surrounded by a buffer 720, which is bounded by a buffer boundary 730. The buffer 720 includes a portion of geometry data outside the tile boundary 710. FIG. 7 shows all of the features that are included in Tile A 610 and the buffer boundary 720 at zoom level 2. As shown, portions of both major roads 410, portions of two of the minor roads 420, and a portion of the lake 450 are included within the buffer boundary 730, and thus are included in the tile data for Tile A 610. The large buildings 430 and one of the minor roads 420 do not fall within the buffer boundary 730, so these features are not included in the tile data for Tile A 610. The tile mapper 330 identifies the features that are partially or fully inside the buffer boundary 730 and associates them with Tile A 610. In other embodiments, the tile mapper 330 identifies the features within the tile boundary 710 and associates them with Tile A 610. In such embodiments, if a feature is included within the buffer boundary 730, but not the tile boundary 710, this feature is not associated with Tile A 610. The tile mapper 330 passes the tile data listing the features included in Tile A 610 (or inside the buffer boundary 730) to the tile encoder 340.

Figure 8:
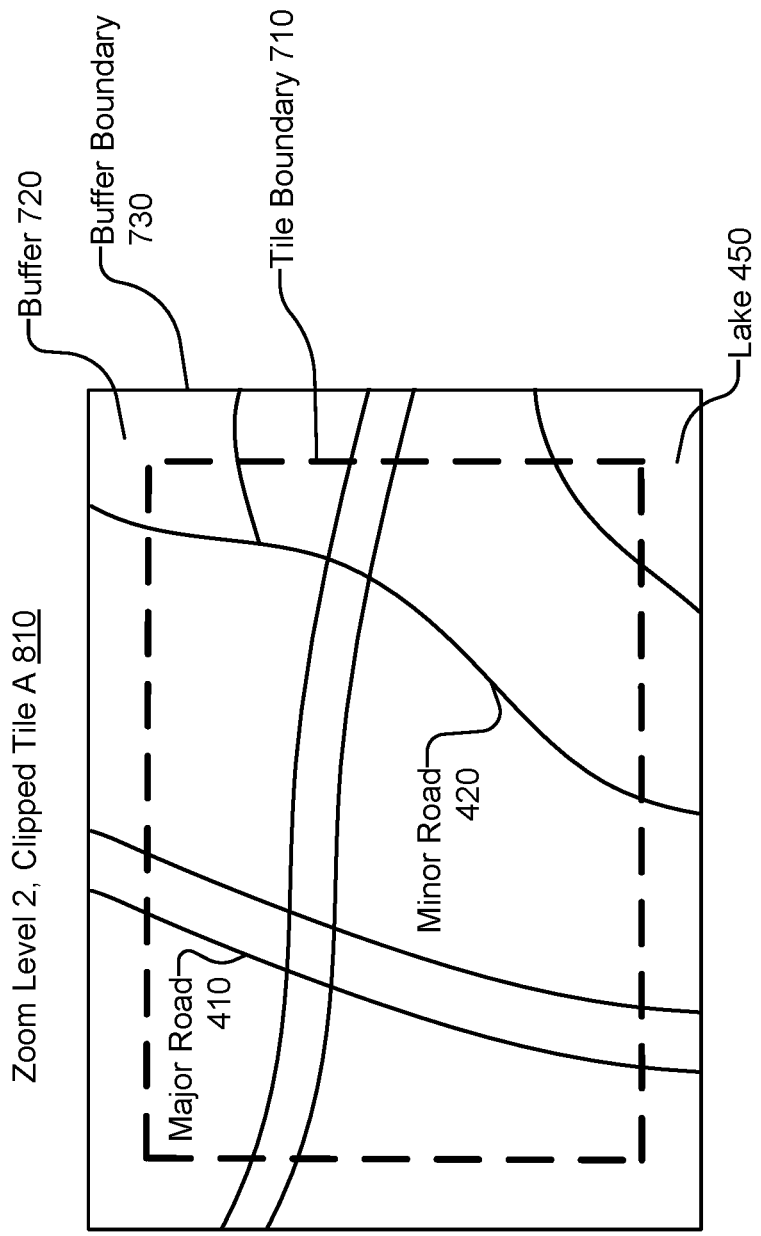
FIG. 8 is an illustration of clipped features for a particular tile at the second zoom level, in accordance with an embodiment.

FIG. 8 is an illustration of clipped features for a particular tile at the second zoom level, in accordance with an embodiment. The tile encoder 340 clips the features included in Tile A, i.e., the two major roads 410, the two minor roads 420, and the lake 450, to the buffer boundary 730 to generate the clipped tile A 810 shown in FIG. 8. The other portions of these features are included in other tiles. For example, as shown in FIG. 6, the lake 450 spans all four tiles 610-640, so the other tiles 620, 630, and 640 each include different portions of the lake 450. The tile encoder 340 encodes the clipped features, as described with respect to FIG. 3.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating vector tiles for map data comprising:
   receiving a plurality of map features from a database of raw map data, each map feature comprising geometry data and property data;
   storing the property data of the plurality of map features in a property store;
   generating a set of zoom data based on the geometry data, the set of zoom data organized into a plurality of zoom levels, each zoom level of the zoom data comprising at least a subset of the plurality of map features;
   mapping map features of the set of zoom data to a plurality of tiles, the plurality of tiles comprising a set of tiles for each of the plurality of zoom levels; and
   for each tile of the plurality of tiles:
      clipping map features mapped to the tile based on a boundary of the tile;
      encoding the clipped map features to a vector format; and
      merging the encoded clipped map features with the stored property data corresponding to the encoded clipped map features included in the tile to build a vector tile.

2. The method of claim 1, wherein generating the set of zoom data based on the geometry data comprises, for one zoom level of the set of zoom data:
   selecting a subset of the plurality of map features based at least in part on a size of each map feature in the selected subset and the zoom level; and
   for at least one map feature of the selected subset, simplifying the geometry data of at least one the map feature based on the zoom level.

3. The method of claim 2, wherein a first zoom level of the zoom data comprises a first subset of the plurality of map features, and a second zoom level of the zoom data comprises a second subset of the plurality of map features, wherein the second subset includes the map features in the first subset and map features of the plurality of map features that are not in the first subset.

4. The method of claim 1, wherein generating the set of zoom data for a first zoom level of the plurality of zoom levels is performed in parallel with generating the set of zoom data for a second zoom level of the plurality of zoom levels.

5. The method of claim 1, wherein mapping map features of the set of zoom data to a plurality of tiles for a first zoom level of the plurality of zoom levels is performed in parallel with mapping map features of the set of zoom data to a plurality of tiles for a second zoom level.

6. The method of claim 1, wherein the clipping and encoding for a first tile of the plurality of tiles is performed in parallel with the clipping and encoding for a second tile of the plurality of tiles.

7. The method of claim 1, further comprising assigning each map feature in the plurality of map features a feature identifier, wherein:
   storing the property data of the plurality of map features in the property store comprises storing the property data of each map feature with its feature identifier; and
   merging the encoded clipped map features with the stored property data comprises retrieving, from the property store, the stored property data corresponding to the encoded clipped map features included in the tile based on feature identifiers of the encoded clipped map features.

8. The method of claim 1, wherein each of the plurality of tiles within a particular zoom level corresponds to a different non-overlapping geographic area.

9. The method of claim 1, further comprising storing the set of zoom data in a zoom data store, and wherein clipping map features mapped to the tile based on the boundary of the tile comprises retrieving processed geometry data describing the map features mapped to the tile from the zoom data store.

10. The method of claim 1, wherein clipping the map features mapped to the tile based on the boundary of the tile comprises:
    adding a buffer to the tile, the buffer having a boundary outside the boundary of the tile; and
    clipping the map features mapped to the tile to the boundary of the buffer.

11. A non-transitory computer readable storage medium configured to store program code, the program code comprising instructions that, when executed by one or more processors, cause the one or more processors to:
    receive a plurality of map features from a database of raw map data, each map feature comprising geometry data and property data;
    store the property data of the plurality of map features in a property store;
    generate a set of zoom data based on the geometry data, the set of zoom data organized into a plurality of zoom levels, each zoom level of the zoom data comprising at least a subset of the plurality of map features;
    map map features of the set of zoom data to a plurality of tiles, the plurality of tiles comprising a set of tiles for each of the plurality of zoom levels; and
    for each tile of the plurality of tiles:
       clip map features mapped to the tile based on a boundary of the tile;
       encode the clipped map features to a vector format; and
       merge the encoded clipped map features with the stored property data corresponding to the encoded clipped map features included in the tile to build a vector tile.

12. The non-transitory computer readable storage medium of claim 11, wherein the instructions to generate the set of zoom data based on the geometry data comprise instructions to, for one zoom level of the set of zoom data:
    select a subset of the plurality of map features based at least in part on a size of each map feature in the selected subset and the zoom level; and
    for at least one map feature of the selected subset, simplify the geometry data of the at least one map feature based on the zoom level.

13. The non-transitory computer readable storage medium of claim 12, wherein a first zoom level of the zoom data comprises a first subset of the plurality of map features, and a second zoom level of the zoom data comprises a second subset of the plurality of map features, wherein the second subset includes the map features in the first subset and map features of the plurality of map features that are not in the first subset.

14. The non-transitory computer readable storage medium of claim 11, further comprising instructions to generate the set of zoom data for a first zoom level of the plurality of zoom levels in parallel with generating the set of zoom data for a second zoom level of the plurality of zoom levels.

15. The non-transitory computer readable storage medium of claim 11, further comprising instructions to map map features of the set of zoom data to a plurality of tiles for a first zoom level of the plurality of zoom levels in parallel with mapping map features of the set of zoom data to a plurality of tiles for a second zoom level.

16. The non-transitory computer readable storage medium of claim 11, further comprising instructions to perform the clipping and encoding for a first tile of the plurality of tiles in parallel with performing the clipping and encoding for a second tile of the plurality of tiles.

17. The non-transitory computer readable storage medium of claim 11, further comprising instructions to assign each map feature in the plurality of map features a feature identifier, wherein:
- the instructions to store the property data of the plurality of map features in the property store comprise instructions to store the property data of each map feature with its feature identifier; and
- the instructions to merge the encoded clipped map features with the stored property data comprise instructions to retrieve, from the properties store, the stored property data corresponding to the encoded clipped map features included in the tile based on feature identifiers of the encoded clipped map features.

18. The non-transitory computer readable storage medium of claim 11, wherein each of the plurality of tiles within a particular zoom level corresponds to a different non-overlapping geographic area.

19. The non-transitory computer readable storage medium of claim 11, further comprising instructions to store the set of zoom data in a zoom data store, and wherein the instructions to clip map features mapped to the tile based on the boundary of the tile comprise instructions to retrieve processed geometry data describing the map features mapped to the tile from the zoom data store.

20. The non-transitory computer readable storage medium of claim 11, wherein the instructions to clip the map features mapped to the tile based on the boundary of the tile comprise instructions to:
- add a buffer to the tile, the buffer having a boundary outside the boundary of the tile; and
- clip the map features mapped to the tile to the boundary of the buffer.

* * * * *

UNITED STATES PATENT AND TRADEMARK OFFICE
CERTIFICATE OF CORRECTION

PATENT NO.        : 10,921,136 B2
APPLICATION NO.   : 16/169584
DATED             : February 16, 2021
INVENTOR(S)       : Thompson et al.

It is certified that error appears in the above-identified patent and that said Letters Patent is hereby corrected as shown below:

On the Title Page

Item (58), in Column 1, under "Field of Classification Search", Line 2, below "G09B 29/106" insert -- USPC.................... 701/532 --.

In the Claims

In Column 15, in Claim 2, Line 33, delete "one the" and insert -- one of the --, therefor.

In Column 17, in Claim 17, Line 17, delete "properties" and insert -- property --, therefor.

Signed and Sealed this
Twenty-seventh Day of December, 2022

Katherine Kelly Vidal
*Director of the United States Patent and Trademark Office*